Oct. 8, 1940.  W. E. VAN DORN  2,217,034
SUSPENSION SYSTEM FOR VEHICLES
Filed Nov. 7, 1939  5 Sheets-Sheet 5

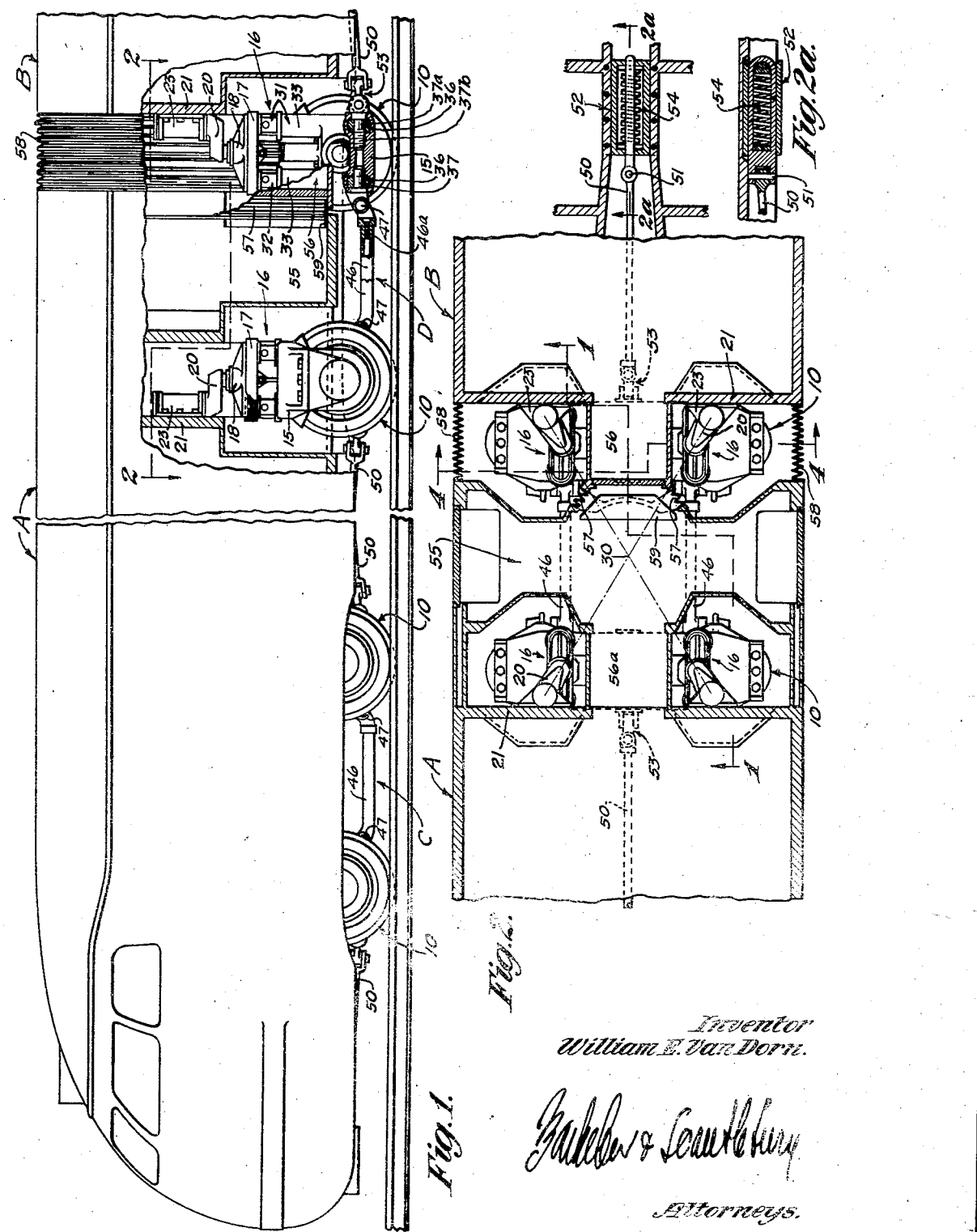

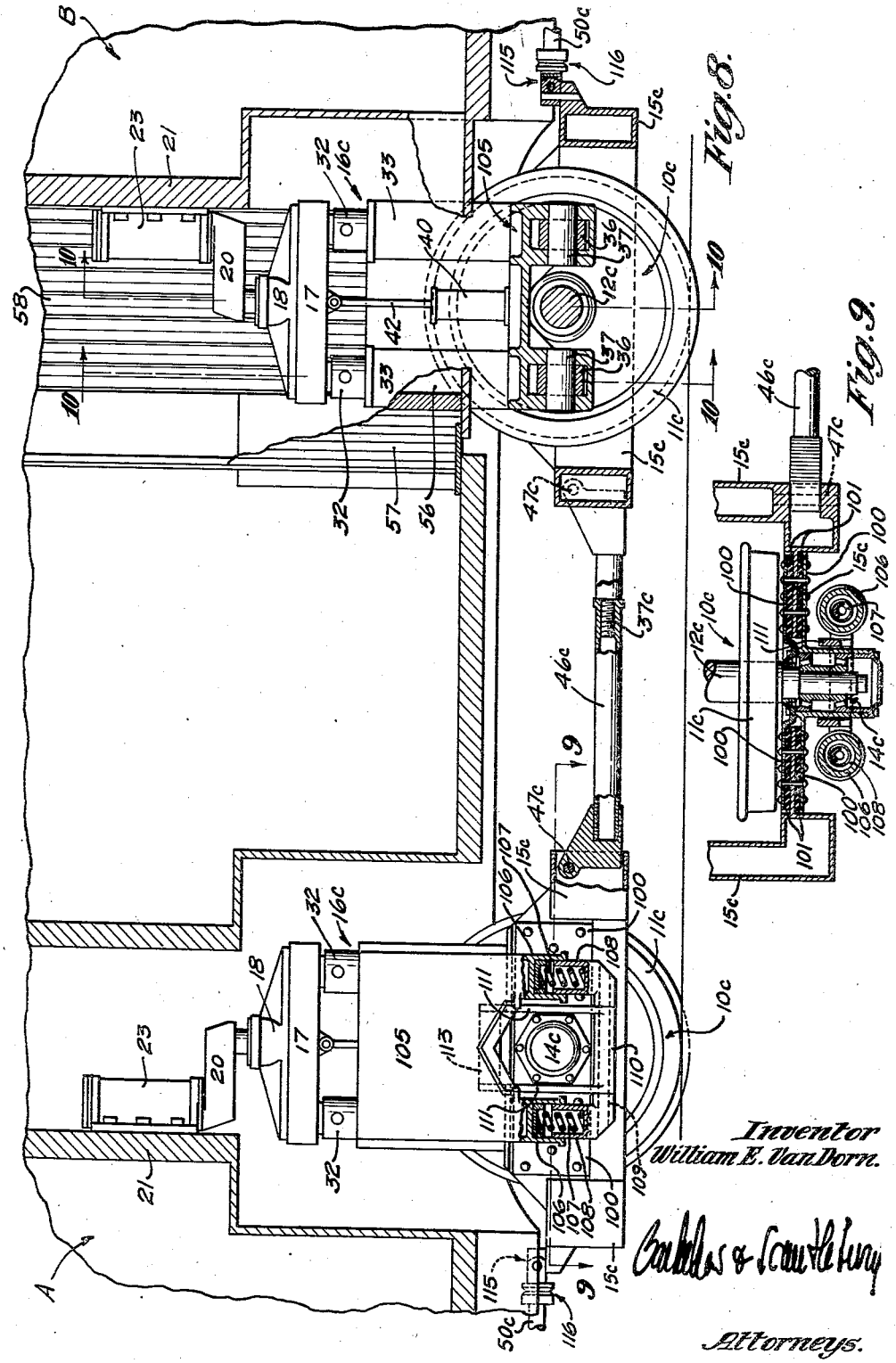

Inventor
William E. Van Dorn.
Barkilen & Scantlebury
Attorneys.

Patented Oct. 8, 1940

2,217,034

UNITED STATES PATENT OFFICE 2,217,034

SUSPENSION SYSTEM FOR VEHICLES

William E. Van Dorn, Los Angeles, Calif., assignor to Pacific Railway Equipment Company, Los Angeles, Calif., a corporation of California Application November 7, 1939, Serial No. 303,232

18 Claims. (Cl. 105—4)

This invention relates to suspension systems for vehicles. The invention is generally applicable to various types of vehicles, and although it has been specifically designed for application to railway vehicles and will therefore be illustratively described as applied to them, the invention is not limited to that particular application and use. The invention has two further adaptations and uses, one for the suspension and control of vehicle bodies regardless of articulation, and the other for suspension, control and draft connection of articulated vehicle bodies.

This present application and its appended claims are directed to the system of suspension and control and draft connection for articulated vehicles. My copending application entitled suspension system for vehicles, filed on even date herewith and bearing Ser. No. 303,231, and the claims therein, are directed to the system of suspension and control of general adaptation regardless of articulation. The present application is a continuation in part of my application entitled. Suspension system for vehicles, Ser. No. 43,692, filed October 5, 1935, and said copending application, Ser. No. 303,231 is a divisional continuation in part of said previously filed application.

The general object of the invention is the provision of a system of articulation, draft connection, suspension and control which enables vehicle bodies, and particularly railway vehicles, to be hung at a level lower than that necessitated by present vehicle suspensions, which gives to the vehicle body a controlled oscillatory motion about a high level longitudinal axis, rather than the tilting or rolling motion to which present day vehicle bodies are subjected when subject to lateral forces; and, in general, gives to such a vehicle body controlled motions and freedoms that result in higher safety and increased passenger comfort, and therefore enables higher speed to be attained even with lighter bodies and on present day road beds and within the present regulations and restrictions applied to railway rolling stock.

My invention provides for hanging the vehicle body at a relatively low level and with a relatively low center of gravity. And also, by the nature and action of its load-taking elements, and by its provision of lateral restraint applied to the body at a high level, it provides for oscillatory swinging of the body about a high longitudinal axis above the center of gravity. This last mentioned provision causes the body to swing pendulously when subjected to any lateral thrusts, such as the lateral thrusts due to misalinement of trackage or centrifugal thrusts in rounding curves. The motion of the body under such thrusts is one of pendulous swinging or banking rather than that of tilting or rolling.

In its preferred form, as herein described, the suspension and control system involves a set or unit of two laterally spaced supporting and controlling elements each mounted below upon the truck or wheel unit without the intervention of any bolster frame or central support in the nature of a swivel. These two supporting and controlling elements are spaced laterally from each other at opposite sides of, and symmetrically with respect to, the longitudinal center of the truck and body. They extend upwardly from the truck or wheel unit, being more or less columnar in nature, and are supportingly and controllingly connected with the body, or some rigid portion of the body, through flexible or articulative parts located at a level above substantially the level of the body center of gravity. Each of these elements includes a member having a vertically elastic or vertically yielding action by which the load of the body is sprung and by which the body is given the oscillatory freedom necessary for its swinging banking action. And each of these elements also includes articulated members which, connecting with the body at the high level, restrict or restrain lateral translative motion of the body at that high level and consequently fix a high level swinging axis for the body.

The articulate members which have just been spoken of also include suspension and body guiding and control members which also provide for the horizontal swivelling motion of the body with relation to the truck or wheel and axle unit. And in the particular phase of the invention with which this application deals these articulate members, specifically illustrated in the form of pairs of horizontally swinging links or arms, give the body a virtual swivelling center which may be longitudinally removed from the points of suspension. The adjacent ends of two articulated vehicle bodies are mounted upon a single intervening truck, through which truck the draft forces between the bodies are exclusively transmitted. Preferably the articulated arrangement is such that the two adjacent bodies, mounted on a single truck, have substantially coincident swivelling centers.

Finally each of the two articulated bodies is draft-connected with the common truck through a draft connection which is arranged at the relatively low level of the truck or wheel unit and well below the level at which the bodies are suspended upon the truck. This draft connection, preferably and illustratively in the form of a longitudinal draft bar, is freely flexible in all directions except longitudinally. In a longitudinal direction it has some yieldability, for the absorption of longitudinal shocks; but its structure and action are such that the draft forces which are transmitted through the truck at a low level are transmitted between the truck and the car bodies exclusively through the low level draft connections, and not through the high level suspension and control connections to the body.

Further objects and the corresponding features and accomplishments of the invention will be understood from the following detailed and specific description of illustrative embodiments, reference for the purpose being had to the accompanying drawings, in which:

Fig. 1 is a fragmentary side view, partly in elevation and partly in section on line 1—1 of Fig. 2, showing my suspension and control system typically applied;

Fig. 2 is a plan section taken as indicated by line 2—2 on Fig. 1;

Fig. 2a is a detail section taken as indicated by line 2a—2a on Fig. 2;

Fig. 8 is a longitudinal vertical section similar to the longitudinal vertical sectional parts of Fig. 1, but showing a modified truck and suspension structure;

Fig. 9 is a fragmentary detail section as taken by line 9—9 on Fig. 8;

Figure 3:
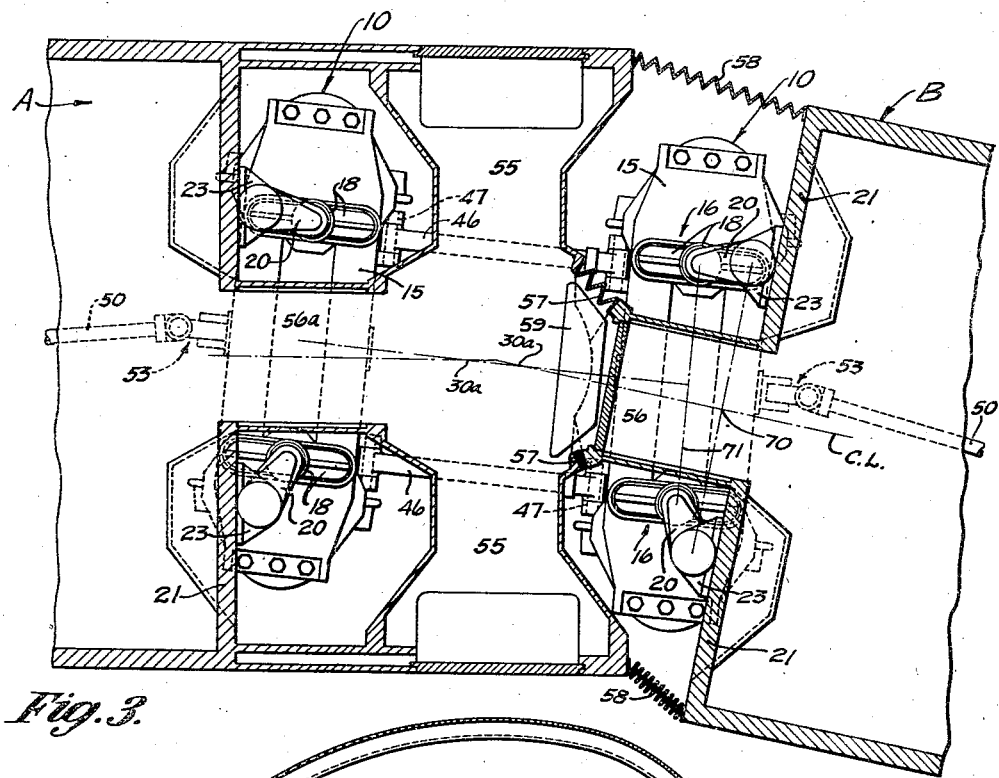
Fig. 3 is an enlarged plan section similar to Fig. 2 but illustrating the articulation action of the suspension system in rounding curves.

In the drawings in Fig. 1 I have illustrated two vehicle bodies A and B, suspended on two truck units which are designated generally in Fig. 1 as C and D. Each of these truck units C and D comprises two wheel and axle units 10; and the vehicle body A is illustrated as being supported at one end upon both the axle units 10 of truck unit C; while the truck unit D has one of its wheel and axle units 10 supporting an end of vehicle body A and its other wheel and axle unit 10 supporting the adjacent articulated end of vehicle body B. The two truck units C and D and their body suspending and controlling devices are the same. Particular description will be given for the one that suspends both car bodies.

As illustrated here, each wheel and axle unit comprises a pair of wheels 11, each wheel being set on a stub axle 12 which is suitably journaled at 13 and 14 in an axle frame 15 of the "drop" or U type. Mounted upon each axle frame 15 there are two upwardly reaching and laterally spaced columnar structures 16 which include upper heads 17 that are vertically movable. These upper heads 17 carry one member 18 of a universal joint, here shown as a ball-and-socket joint; and the other member 19 of the joint is carried by the free end of a pivoted link or arm 20. These pivoted arms are connected with and mounted upon a rigid portion of the respective car body, as for instance upon a structural cross partition 21. The links 20 lie in a substantially horizontal plane and are of the general nature of cranks, being connected with the car body through their vertical pivotal shafts 22 being mounted in journals 23 which are rigidly attached to the structural partitions 21. The arms 20 are thus mounted so that they may swing about vertical axes in a horizontal plane with reference to the car body. And the general arrangement is such that in their normal positions the two link arms 20 of each pair converge, when viewed in plan, toward a point 30 which is located in the longitudinal central plane of the car body and longitudinally removed from the transverse plane through the universal joints 18, 19. And, as shown in Fig. 2, the other pair of links 20 which are associated with the other wheel and axle unit belonging to the same truck, also preferably converge in plan on that same point 30, for reasons which will hereinafter appear. The general function of these pivoted links is to allow the car body to swivel about a vertical swivelling axis, with relation to the truck. The function performed by the arrangement of these links in horizontal converging disposition is to space the vertical swivelling axis longitudinally from the supporting elements.

Figure 4:
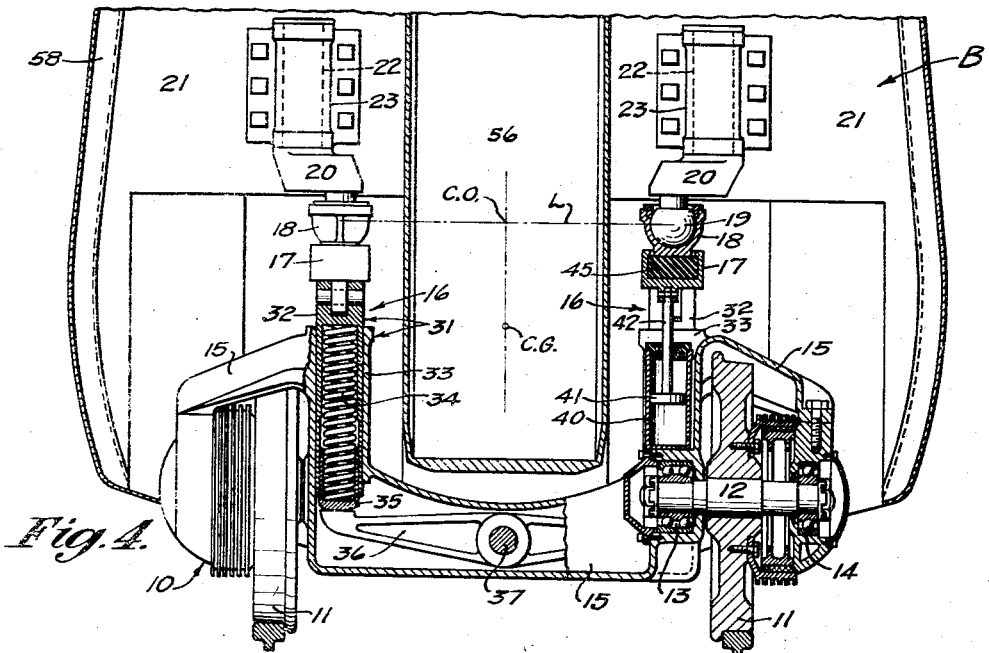
Fig. 4 is an enlarged cross section taken as indicated by line 4—4 on Fig. 2.

Each columnar structure 16 is here shown as including two vertical longitudinally spaced telescopic spring columns 31. In Fig. 4 these spring columns are shown as comprising vertically movable plungers 32 which are vertically guided in the portions 33 of frame 15, and which are directly attached to and support heads 17. Springs 34 are contained within the telescopic column thus formed and support plungers 32 and head 17 and thus elastically support the weight of the car body through the articulation formed by the universal joints 18, 19 and the swinging arms 20.

In the form of suspension shown in Fig. 4 the lower ends of springs 34 are supported in cups 35, and opposite spring-supporting cups are supported on the opposite ends of a lateral equalizing lever 36 which is centrally pivoted on the pivot pin 37 or 37a mounted in frame 15. By reference to Fig. 1 it will be seen that one of these levers 36 is mounted upon a short central longitudinal stud pin 37, while the stud pin 37a which carries the other lever 36 is screw-threaded at 37b into frame 15, so as to be securely longitudinally connected with the frame and at the same time to be rotative about a longitudinal axis, for purposes which will appear.

Associated with each columnar structure 16 there is preferably a dash-pot which comprises a cylinder 40 and a piston 41 whose rod 42 is directly attached to the column structure head 17. The details of this dash-pot structure need not be described as they are well known. The purpose and function is to retard and damp the vertical movements and vertical oscillations of the columnar structures and the car bodies.

The mounting of frame 15 upon its respective wheels may be through the medium of any suitable mounting arrangement. In the present illustration the frame is shown as carrying the axle bearings directly, without the interposition of any means allowing relative movements or means for absorbing shocks. Each head 17 carries a rubber or similar pad 45 upon which the universal joint element 18 is carried, for the purpose of shock absorption, and allowance for errors of misalinement.

As shown in Figs. 1, 2 and 3, the two axle frames 15 of each truck are interconnected by a pair of longitudinally extending and laterally spaced connector links 46 whose opposite ends are connected to the axle frames 15 by the horizontal pivot pins 47. By removing these pins the two wheel and axle units may be separated and the two adjacent cars thereby be disconnected. Each of these links 46 contains a screwthreaded swivel joint 46a which allows of swivelling about a longitudinal axis. By the described structure the two axle frames, and the two wheel and axle units of each truck are interconnected so that in plan the two wheel and axle units form a substantially rigid parallelogram in which the axes of the axles are kept substantially in parallelism; but at the same time the two axle frames may tilt relative to each other and to the respective car body or bodies, in a longitudinal plane, and also may twist about a longitudinal axis relative to each other in order to properly follow uneven trackage.

The columnar structures 16 reach up above the axle frames and into the car bodies to such an elevation that the level L of the two articulate ball joints 18, 19, is preferably well above the body center of gravity which is indicated C. G. in the drawings. This is for the purpose of suspending the body for lateral swinging oscillation about a longitudinal center above substantially the level of center of gravity, and for the purpose of applying to the body, at that high level, a restraint on its lateral motion which will force the body to oscillate about that high center of oscillation. But this suspension and control connection to the body at that high level does not constitute a longitudinal draft connection. In fact, in the present illustrative structure no draft forces at all are transmitted through that high connection because the two wheel and axle frames, and the truck, are not restricted by that high connection against longitudinal movement relative to the car body or bodies. The whole structure, including the longitudinally tiltable frame 15 that forms the base of the supporting columns, is such that the supporting columnar structures are longitudinally tiltable with reference to the body and the truck and consequently allow relative longitudinal freedom to the body.

Longitudinal draft connection between the trucks, or the wheel and axle units, and the respective body or bodies is here illustrated as being made exclusively at a relatively low level; at substantially the level of the axle frames or of the axles themselves, and well below the level of suspension and control connection to the body. Thus each wheel and axle unit, or axle frame, is connected to its respective body by a low level longitudinal draw bar 50. The body end of this draw bar is connected by the vertical loose pivot 51 with the yielding or spring device 52 which is mounted on the under side of the body frame. And the truck end of each draw bar is shown as connected through the universal joint 53 with the outer end of the swivelling pivot stud 37a. The spring device 52 is of the ordinary and well-known construction which opposes the action of its comparatively stiff spring 54 to relative longitudinal movement of the draw bar 50 in either direction. The draft connection is thus one which limits and restricts relative longitudinal movement between the truck or wheel and axle unit, and car body, at a low level, but allows all other relative movements by reason of the lateral, vertical and torsional flexibility of the draft connection.

As I have noted before, Fig. 1 shows the track D in an arrangement where it performs the function of articulation between the two car bodies A and B. In Figs. 1, 2 and 3, these two car bodies A and B are shown in close end to end relation, but there is no draft connection directly between the two car bodies, all draft between the two car bodies, both positive and negative, being transmitted exclusively at low level through the truck and the longitudinal draft connection to and between the car bodies.

In the figures referred to the car A is shown as having the entrance and exit vestibule 55 at one end. The adjacent end of car B is not provided with such a vestibule but only with the small entrance passage 56 which, corresponding to the passage 56a in the car A, lies between the two supporting columnar structures 16. Thus, only one end of each car needs have an entrance vestibule, and the total floor space of each car may therefore be more efficiently utilized for passenger or other purposes. As shown in the drawings the two adjacent car ends are simply juxtaposed, intervening bellows, or other similar elements 57 and 58 and a floating floor panel 59 closing the intervening gaps.

The several relative motions between the truck or wheel and axle unit and the car body will now be explained. Relative longitudinal motion is allowed by the action just above explained, being allowed by the relative longitudinal movement, longitudinal tipping, of the columnar structures which suspend and control the car body at the described relatively high level. The relative longitudinal movement is allowed by the described longitudinal movement of the supporting structure, and is controlled and restricted solely by the low level draft connection.

Figure 5:
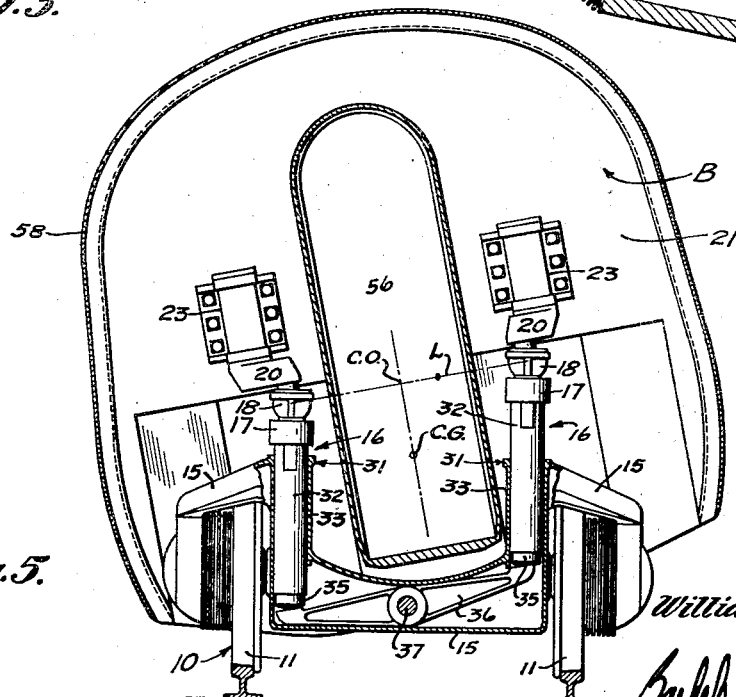
Fig. 5 is a sectional view showing typical positions of the parts of the suspension system when the body swings about its high longitudinal axis.

Relative lateral movement between the car body and the truck or wheel and axle unit takes place in the form of lateral oscillation or swinging of the car body about the defined high level longitudinal axis. Whenever the car body is subjected to any lateral thrust, as for instance by lateral unevenness of trackage, or by centrifugal forces engendered in rounding a curve, those lateral thrusts and forces may be considered as a single lateral force acting upon the center of gravity or mass of the car body. Due to the fact that the car body is restrained against lateral motion at the high level L, and due also to the fact that the lateral restraining means is articulate (such as is represented by the ball joints at the upper ends of the vertically yielding and vertically movable controlling columns) the body is restrained from translative lateral movement at that level and consequently must move laterally about a longitudinal axis disposed substantially at that level. Thus, when subjected to any lateral thrusts, the body swings about a high longitudinal center of oscillation located substantially at the position denoted C. O. in the drawings. Fig. 5 illustrates a typical relative position taken by the body when subjected to a lateral thrust from the left in that figure. The left hand columnar structure 16 is depressed while the right hand structure rises. In the form of the invention shown in Figs. 4 and 5, the two columnar structures may, although not necessarily, rise and fall equally, and the two sets of springs 34 may remain under substantially equal compression, due to the equalizing action of lever 36. And the dash-pots act to retard and damp the swinging oscillation to whatever degree may be desired.

Figure 6:
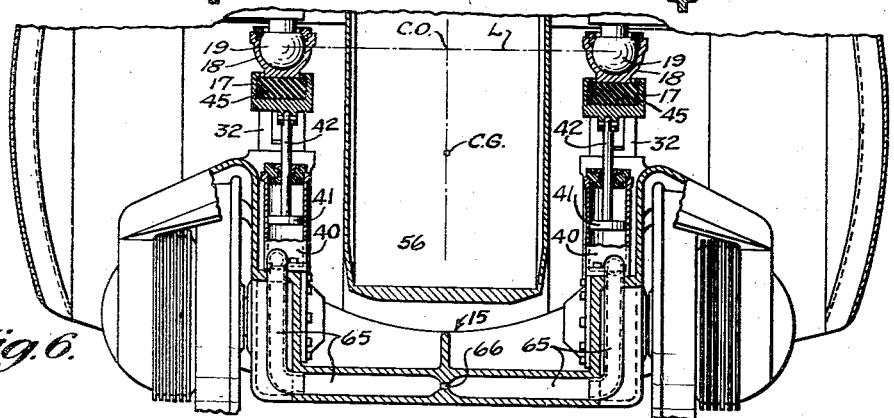
Fig. 6 is a cross section showing a modified construction.
Figure 7:
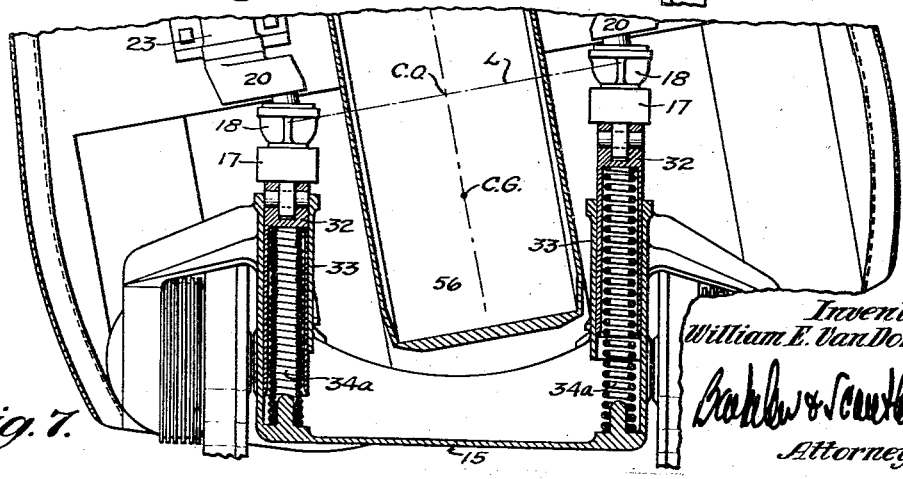
Fig. 7 is a cross section of the form shown in Fig. 6 and illustrating the swinging or banking action of that form.

In the form of the invention shown in Figs. 6 and 7, the equalization connection between the two laterally spaced supporting and controlling structures may be applied to those structures through the medium of the dash-pot controls instead of through the medium of the suspension springs. Here the equalization is shown as being effected by a fluid conduit 65 which is connected between the lower ends of the opposite dash-pot cylinders 40, the conduit containing a restricted orifice 66 of a size suitable to the degree of retardation and damping desired. And in this form of the invention the lower ends of the supporting springs 34a, instead of being mounted on the equalizing lever 36, are mounted directly upon the axle frame 15.

In this form of the invention oscillative swinging about the high center of oscillation is caused and controlled by the same suspensions and lateral controls as before described; but in this case the oscillative swinging is allowed by the elastic compressions and extensions of the suspension springs 34a, instead of by the bodily yielding vertical movement of the spring columns which may take place in the form previously described.

So far as concerns the motion of lateral oscillation of the car body, the centers of the ball joints 18, 19 may be looked at as the points at which the vertically yielding and articulate suspension and controlling columns are connected with a rigid portion of the car body. If the body and truck are travelling a straight-away track the link arms 20 remain rigidly in substantially the relative positions that are shown in Fig. 2. When the car body swings to such a position as illustrated in Figs. 5 and 7, the linear distance between the centers of the articulate joints 18, 19 increases slightly, and the angle of convergence of the laterally opposed arms of a pair consequently decreases slightly. But, in whatever relative position the arms are put by that action, they still remain in full effect rigid parts of the body insofar as translative lateral movement of the body at that level is concerned. And the same is true when the relative positions of the arms are changed by swivelling action of the car body with relation to the truck when rounding a curve. Lateral forces cannot move the body translatively at the level L, regardless of the relative positions of arms 20 except to the slight extent permitted by the lateral elasticity of pads 45.

Figure 11:
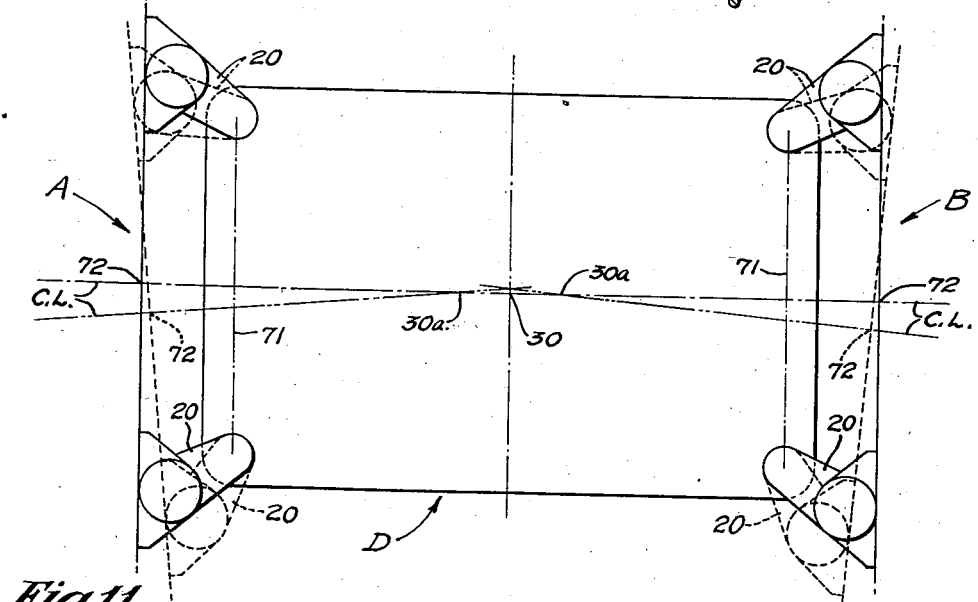
Fig. 11 is a diagrammatic plan illustrating the swivelling action of the bodies upon the common truck.

The swivelling action of the various parts in rounding a curve is illustrated in Figs. 3 and 11. Due to the orientation, in plan, of the two sets of link arms 20, a virtual swivelling center is set up for both car bodies A and B at the common center indicated by the numeral 30 in Figs. 2 and 11, when the car bodies and truck are in their normal straight-away position. In rounding a curve, when the car bodies A and B take such a relative angular position as shown in Fig. 3 and in dotted lines in Fig. 11, the arms 20 swing in horizontal planes to the typical positions shown in that figure. For an average or normal maximum angularity of the car bodies, or normal minimum curve radius, the virtual centers of swivelling of the two car bodies remain very closely coincident, having a maximum displacement to such points as are indicated at 30a in Figs. 3 and 11. In Fig. 11 the longitudinal center lines of the car bodies A and B are indicated at "C. L.", in both straight-away and angular positions. The swinging arms 20 are shown in normal straight-away positions in full lines, and in dotted lines for their positions corresponding to the angular body positions.

Again it may be noted that into whatever relative angular positions the arms 20 are moved by swivelling motions of the car bodies, the arms in that position are rigid with respect to the car bodies so far as relative movement by any lateral forces are concerned. And consequently the columnar structures which suspend and control motions of car body still exert their lateral restraints on the car body at the specified high level, acting through the effectively rigid arms 20.

It may also be noted that when there is a change in the angular relationship of the two arms 20 of a pair, as for instance shown in Fig. 3 or 11, the car body also moves slightly longitudinally with reference to the truck or the wheel and axle unit. Thus, in Figs. 3 and 11, the arms of each pair have moved to a greater angle of convergence than in the normal position of Fig. 2. The point indicated diagrammatically at 70 in Fig. 3, or the point 72 in Fig. 11, is a fixed point with relation to the car body B. The transverse line indicated diagrammatically at 71 in those figures is a fixed line in relation to the upper ends of the supporting columnar structures 16. In moving to the relative positions shown in Figs. 3 and 11 the distance of point 70 or 72, measured along center line C. L. of the body, is somewhat less than it is when the car bodies and truck are in their normal straight-away positions. This slight relative longitudinal movement between the car body and the upper ends of the suspension system is allowed for mainly or quite wholly by the longitudinal tilting of the suspension system which has been before described as allowing relative longitudinal movement between the car body and the truck or wheel and axle unit. The draft connection may allow some slight relative longitudinal movement between the car body and the truck or wheel and axle unit, but by the very nature of its duties its longitudinal yielding is comparatively stiff. Relative longitudinal movement between the car body and the truck or wheel and axle unit, from whatever cause, is therefore taken care of by the longitudinal tilting yieldability of the up-standing columnar supporting and control structures, tilting about the axis of the wheel and axle unit and about the horizontal transverse high axis which extends between the laterally opposed ball joints 18, 19 of a pair.

Figure 10:
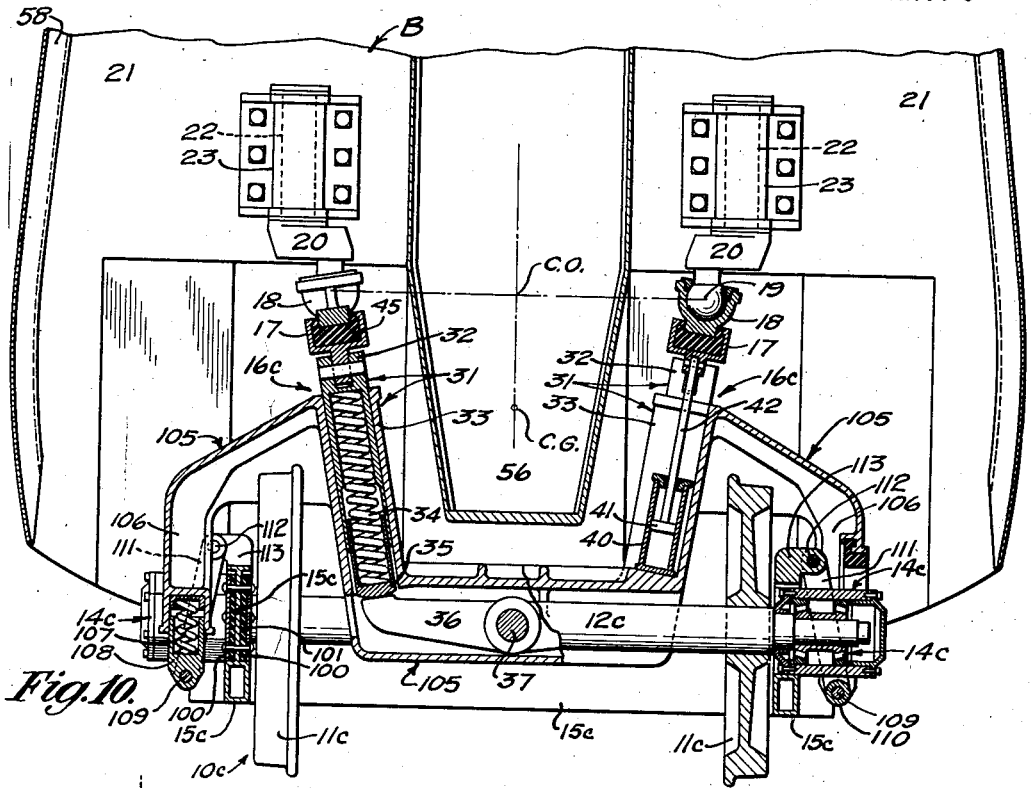
Fig. 10 is a vertical cross section, of which the left hand half and the right hand half are taken, respectively, on the left and right lines 10—10 in Fig. 8.

In Figs. 8, 9 and 10 I have illustrated a somewhat modified form of truck structure and suspension. Here the truck is illustrated as made up of two wheel and axle units 10c each provided with a frame 15c, and the two frames interconnected by bars 46c, similar to the parts 46 previously explained, and similarly pivotally connected at 47c to the two axle frames 15c, and each bar also having within its length a swivelling connection 37c. In this form, instead of the wheels 11c being mounted on stub axles, the wheels of each unit are mounted upon a common axle 12c which is carried in bearing structures 14c. As shown in detail in Fig. 9 these bearing structures have laterally extending plates 100 which are connected with parts of frame 15c through the intervention of rubber or other suitable shock-absorbing pads 101. The frames 15c are thus substantially rigidly mounted upon the axles, but are capable of slight relative movements in all directions for shock absorption.

In this modified form of structure the body suspending and controlling system includes not only structures 16c which are similar to the columnar structures heretofore described, but also include structures which allow a certain limited lateral translative movement of the body with reference to the truck or wheel movement of the body with reference to the truck or wheel and axle unit.

In Figs. 8 and 10 the structures 16c are shown as being mounted upon an intermediate cradle 105 which has lateral depending arms 106. These lateral depending arms are bifurcated at their lower ends to straddle the journals 14c, and each bifurcated lower end receives a spring 107 and a plunger 108. The two plungers 108 at each end of the cradle are supported upon a horizontal shaft 109 which in turn is supported by a stirrup 110. Each stirrup 110 comprises a pair of depending links 111 whose upper ends are hung from pivots 112 mounted in a head 113 which is a part of the axle frame 15c. In their normal positions, as viewed in Fig. 10, these links 111 hang downwardly and somewhat outwardly, so that the cradle 105 has a limited and substantially translative lateral movement with reference to the axle frame by virtue of the swinging actions of the links. The springs 108 are relatively heavy and stiff, being used mainly for shock absorption purposes, and consequently there is a negligible amount of rolling or tilting action of the car body which can take place by the action of those springs.

The suspension and controlling structures 16c, which correspond to those previously described, may be in either of the forms previously described, but are here shown as similar to those shown in Fig. 4, except that instead of being arranged vertically they are tilted somewhat outwardly with reference to each other. With that modification, the structures 16c are otherwise similar to the structures shown in Fig. 4 and the same numerals are applied to similar parts without the necessity of repeating the description. The draft bars 50c are connected to the two car bodies A and B in the same manners as before described. At their truck ends, instead of being connected to the swivelling shafts 37a as in Fig 1, the draft bars 50c are connected through universal joints 115 and swivels 116 to the axle frames 15c at substantially the level of the axle 12c. The cradle structures 105 have no appreciable longitudinal movement with reference to the axle frames 15c, due to the nature of the hanging stirrups 110, 111, and due also to the fact that the links 111 of these stirrups straddle the journals 14c with small longitudinal clearance.

The foregoing described structures with the exception of that shown in Figs. 8, 9 and 10, are disclosed in my said prior application, Ser. No. 43,692, and to that extent this present application is a continuation of said prior application.

I claim:

1. In an articulated vehicle construction, in combination with two vehicle bodies and a draft transmitting truck common to and positioned under adjacent ends of the two bodies; two body supporting units associated with the truck and each independently supporting a respective body on the truck, each said supporting unit being carried at its lower end by the truck, extending upwardly and having at its upper portion a flexible part located at a level above substantially the center of gravity of the body and through which flexible part it is supportingly connected with the body, and each said supporting unit being tiltable about its lower end in a vertical plane longitudinal of the body, and longitudinal draft connections between the truck and the respective bodies, each comprising a connector located exclusively at substantially the level of the truck and below said first mentioned level, and having flexibility vertically, laterally and torsionally about a longitudinal axis.

2. In an articulated vehicle construction, in combination with two vehicle bodies and a draft transmitting truck common to and positioned under adjacent ends of the two bodies; said truck comprising two wheel and axle units and frames, and longitudinal connection between the two frames allowing the frames to tilt in vertical longitudinal planes; a body supporting unit associated with each said frame, said unit extending upwardly from the frame and having a flexible part located at a level above substantially the center of gravity of a respective body and through which flexible part the supporting unit is supportingly connected with the body, and longitudinal draft connections between the truck and the respective bodies, each comprising a connector located exclusively at substantially the level of the truck and below said first mentioned level, and having flexibility vertically, laterally and torsionally about a longitudinal axis.

3. In an articulated vehicle construction, the combination with two vehicle bodies and a draft transmitting truck common to and positioned under adjacent ends of the two bodies; two body supporting units associated with the truck and each independently supporting a respective body on the truck, each said supporting unit comprising two independently vertically elastic and flexible body supporting elements spaced laterally from each other at opposite sides of the vertical longitudinal central plane of the body, mounted at their lower ends on the truck, extending upwardly above the truck and supportingly engaging a rigid part of the body at their upper ends exclusively at a level above substantially the body center of gravity, and longitudinal draft connections between the truck and the respective bodies, each said connection comprising a connector located exclusively at substantially the level of the truck and below said level of support engagement, said draft connectors being laterally, vertically and torsionally flexible.

4. In an articulated vehicle construction, the combination with two vehicle bodies and a draft transmitting truck common to and positioned under adjacent ends of the two bodies; two body supporting units associated with the truck and each independently supporting a respective body on the truck, each said supporting unit comprising two body supporting elements supported at their lower ends on the truck, spaced from each other laterally at opposite sides of the vertical longitudinal central plane of the body, extending up into the body to a level above substantially the center of gravity of the body, and each said element being vertically yielding, independent supporting connections between the upper ends of each of the supporting elements and the body each of which connections includes an articulation located at said level and capable of flexure in the transverse vertical plane of the two articulations, and means restricting translative lateral movement of said articulations relative to the wheel unit, each of said body supporting units being longitudinally yielding, and longitudinal draft connections between the truck and the respective bodies, each said connection comprising a connector located exclusively at substantially the level of the truck and below said level of support engagement, said draft connectors being laterally, vertically and torsionally flexible.

5. In an articulated vehicle construction, the combination with two vehicle bodies and a draft transmitting truck common to and positioned under adjacent ends of the two bodies; two body supporting units associated with the truck and each independently supporting a respective body on the truck, each said supporting unit comprising two body supporting columnar structures supported at their lower ends on the truck, extending up into the body to a level above substantially the center of gravity of the body, and laterally spaced from each other at opposite sides of the vertical longitudinal central plane of the body, each of said columnar structures being vertically yielding, restricted against lateral movement with relation to the wheel unit and including a vertically elastic supporting element, and independent supporting connections between the upper ends of each of the columnar structures and the respective body, each of which connections includes a flexible part located at said level and capable of flexure in a transverse vertical plane, each of said body supporting units being longitudinally yielding, and longitudinal draft connections between the truck and the respective bodies, each said connection comprising a connector located exclusively at substantially the level of the truck and below said level of support engagement, said draft connectors being laterally, vertically and torsionally flexible.

6. In an articulated vehicle construction, the combination with two vehicle bodies and a draft transmitting truck common to and positioned under adjacent ends of the two bodies; two body supporting and controlling units associated with the truck and each independently supporting a respective body on the truck, each said supporting unit comprising two body supporting elements supported at their lower ends on the truck, spaced laterally from each other at opposite sides of the vertical longitudinal central plane of the body, extending upwardly from the truck and supportingly connected with the body at their upper ends, each of said elements being vertically yielding, and each of said two body-supporting units also including flexible means acting on the body at a level above substantially the center of gravity of the body to restrain translative lateral movement of the body at that level with relation to the truck, and each of said body supporting units being longitudinally yielding, and longitudinal draft connections between the truck and the respective bodies, each said connection comprising a connector located exclusively at substantially the level of the truck and below said level of lateral control, said draft connectors being laterally, vertically and torsionally flexible.

7. In an articulated vehicle construction, in combination with two vehicle bodies and a draft transmitting truck common to and positioned under adjacent ends of the two bodies; two longitudinally spaced body supporting units associated with the truck and each independently supporting a respective body on the truck, each said supporting unit including a pair of laterally spaced and horizontally disposed arms, each arm being pivotally connected at one end to the truck, and at the other end to the respective body, one of said pivotal connections for each arm restricting its motion to swinging in a substantially horizontal plane, said four arms being arranged so as normally to converge toward a substantially common point located in the vertical central longitudinal plane of the bodies and truck and between the two longitudinally spaced body supporting units.

8. In an articulated vehicle construction, the combination of: two bodies; a truck common to the two bodies, comprising a frame and associated axles with wheels thereon; and means independently supporting said bodies on said truck frame at longitudinally spaced points and at points spaced laterally of the longitudinal center lines of the bodes, each said means including a pair of substantially horizontally swinging arms independently pivotally mounted on the truck frame at one end and independently pivotally connected to the bodies at their other ends.

9. In an articulated vehicle construction, the combination of: two bodies; a truck common to the two bodies, comprising a frame and associated axles with wheels thereon; and means independently supporting said bodies on said truck frame at longitudinally spaced points and at points spaced laterally of the longitudinal center lines of the bodies and above their centers of gravity, each said means including a pair of substantially horizontally swinging arms independently pivotally mounted on the truck frame at one end and independently pivotally connected to the bodies at their other ends.

10. In an articulated vehicle construction, the combination of: two bodies; a truck common to the two bodies, comprising a frame and associated axles with wheels thereon; and means independently supporting said bodies on said truck frame at longitudinally spaced points and at points spaced laterally of the longitudinal center lines of the bodies, each said means including a pair of substantially horizontally swinging arms independently pivotally mounted on the truck frame at one end and angularly diverging to independent pivotal connections with the bodies at their other ends.

11. In an articulated vehicle construction, the combination of: two bodies; a truck common to the two bodies, comprising a frame and associated axles with wheels thereon; means independently supporting said bodies on said truck frame at longitudinally spaced points and at points spaced laterally of the longitudinal center lines of the bodies, each said means including a pair of substantially horizontally swinging arms independently pivotally mounted on the truck frame at one end and independenty pivotally connected to the bodies at their other ends; and means located below said points of support to limit movement of the truck frame longitudinally of the body.

12. In an articulated vehicle construction, the combination of: two bodies; a truck common to the two bodies, comprising a frame and associated axles with wheels thereon; a pair of vertically disposed, movable, body-supporting members mounted on each end of the truck frame at points spaced laterally from its longitudinal center line; means interconnecting the two body-supporting members in each of said pairs to balance the vertical movements of one against the other; and a pair of horizontally disposed arms each pivotally connected at one end to a respective one of said members of one of the pairs of vertically movable members and at their opposite ends to the adjacent body, the pivotal connections of said arms to their respective bodies being at points spaced laterally on each side of the longitudinal center lines of the bodies.

13. In an articulated vehicle construction, the combination of: two bodies; a truck common to the two bodies, comprising a frame and associated axles with wheels thereon; a pair of vertically disposed, movable, body-supporting members mounted on each end of the truck frame at points spaced laterally from its longitudinal center line; means interconnecting the two body-supporting members in each of said pairs to balance the vertical movements of one against the other; and a pair of horizontally disposed arms each pivotally connected at one end to a respective one of said members of one of the pairs of vertically movable members and at their opposite ends to the adjacent body, the pivotal connections of said arms to their respective bodies being at points spaced laterally on each side of the longitudinal center lines of the bodies and divergent from the points of connection with each pair of vertically movable members.

14. In an articulated vehicle construction, the combination of: two bodies; a truck common to the two bodies, comprising a frame and associated axles with wheels thereon; and a pair of substantially horizontally disposed members supporting each body on the truck frame at longitudinally spaced points and at points spaced laterally of the longitudinal center lines of the bodies, said members being pivotally connected to the bodies and to the truck frames, and each pair of members converging from the body toward the truck frame and being so positioned and arranged that each of the bodies is caused to turn in a horizontal plane by the articulation of the vehicles, relative to the truck frame, about a virtual, vertical axis longitudinally spaced from the said points of support.

15. In an articulated vehicle construction, the combination of: two bodies; a truck common to the two bodies, comprising a frame and associated axles with wheels thereon; a pair of substantially horizontally disposed members supporting each body on the truck frame at longitudinally spaced points and at points spaced laterally of the longitudinal center lines of the bodies and at or above their centers of gravity, said members being pivotally connected to the bodies and to the truck frames, and each pair of members converging from the body toward the truck frame and being so positioned and arranged that each of the bodies is caused to turn in a horizontal plane by the articulation of the vehicles, relative to the truck frame, about a virtual, vertical axis longitudinally spaced from the said points of support; and means associated with said supporting members whereby the bodies may swing about axes extending longitudinally thereof.

16. In an articulated vehicle construction, the combination of: two bodies; a truck common to the two bodies, comprising a frame and associated axles with wheels thereon; a pair of substantially horizontally disposed members supporting each body on the truck frame at longitudinally spaced points and at points spaced laterally of the longitudinal center lines of the bodies, said members being pivotally connected to the bodies and to the truck frames and each pair of members converging from the body toward the truck frame and being so positioned and arranged that each of the bodies is caused to turn in a horizontal plane by the articulation of the vehicles, relative to the truck frame, about a virtual, vertical axis longitudinally spaced from the said points of support; and means located below said points of support to limit movement of the truck frame longitudinally of the body.

17. In an articulated vehicle construction, the combination of: two bodies; a truck common to the two bodies, comprising a frame and associated axles with wheels thereon; a pair of substantially horizontally disposed members supporting each body on the truck frame at longitudinally spaced points and at points spaced laterally of the longitudinal center lines of the bodies and at or above their centers of gravity, said members being pivotally connected to the bodies and to the truck frames, and each pair of members converging from the body toward the truck frame and being so positioned and arranged that each of the bodies is caused to turn in a horizontal plane by the articulation of the vehicles, relative to the truck frame, about a virtual, vertical axis longitudinally spaced from the said points of support; means associated with said supporting members whereby the bodies may swing about axes extending longitudinally thereof; and means located below said points of support to limit movement of the truck frame longitudinally of the body.

18. In an articulated vehicle construction, the combination with two vehicle bodies and a draft transmitting truck, common to and positioned under adjacent ends of the two bodies; two longitudinally spaced body supporting units associated with the truck and each independently supporting a respective body on the truck, each said supporting unit including a pair of vertically movable body supporting elements supported at their lower ends on the truck, spaced laterally from each other at opposite sides of the vertical longitudinal central plane of the body, extending upwardly from the truck to a level above substantially the center of gravity of the body, independent supporting connections between the upper ends of the vertically movable elements and the respective body, each of which connections includes a flexible part located at said level and capable of flexure in a transverse vertical plane, and means interconnecting the two vertically movable elements to balance the vertical movements of one against the other; each of said body supporting units being longitudinally yielding; and longitudinal draft connections between the truck and the respective bodies, each said connection comprising a connector located exclusively at substantially the level of the truck and below said first mentioned level, said draft connectors being laterally, vertically and torsionally flexible.

WILLIAM E. VAN DORN.